United States Patent [19]
Husted

[11] 4,206,828
[45] Jun. 10, 1980

[54] POWER DRIVEN SKI-BOB WITH SELF ENERGIZING FRAME

[75] Inventor: Royce H. Husted, Wheaton, Ill.

[73] Assignee: Saroy Engineering, Wheaton, Ill.

[21] Appl. No.: 972,911

[22] Filed: Dec. 26, 1978

[51] Int. Cl.² .................................................. B62M 27/02
[52] U.S. Cl. ...................................... 180/184; 180/190
[58] Field of Search .................. 180/5 R, 190, 184; 280/11.11 E

[56] References Cited

U.S. PATENT DOCUMENTS

| 3,721,308 | 3/1973 | Brandli | 180/5 R |
| 3,893,526 | 7/1975 | Esch | 180/5 R |
| 3,913,692 | 10/1975 | Lohr | 180/5 R |
| 4,109,739 | 8/1978 | Husted | 180/190 |

Primary Examiner—John J. Love
Assistant Examiner—John A. Carroll
Attorney, Agent, or Firm—Samuel Shiber

[57] ABSTRACT

A power driven ski-bob with an elongated propulsion unit having preferably an anterior sliding portion, a posterior endless tread portion and an upwardly extending post means; the propulsion unit is connected to the rest of the ski-bob's structure through a pivoting connection which is substantially higher than the sliding and tread portions so that the pressure between these portions and the snow is decreased and increased respectively, in response to said tread generating thrust against the snow to secure the engagement between the tread and snow.

9 Claims, 2 Drawing Figures

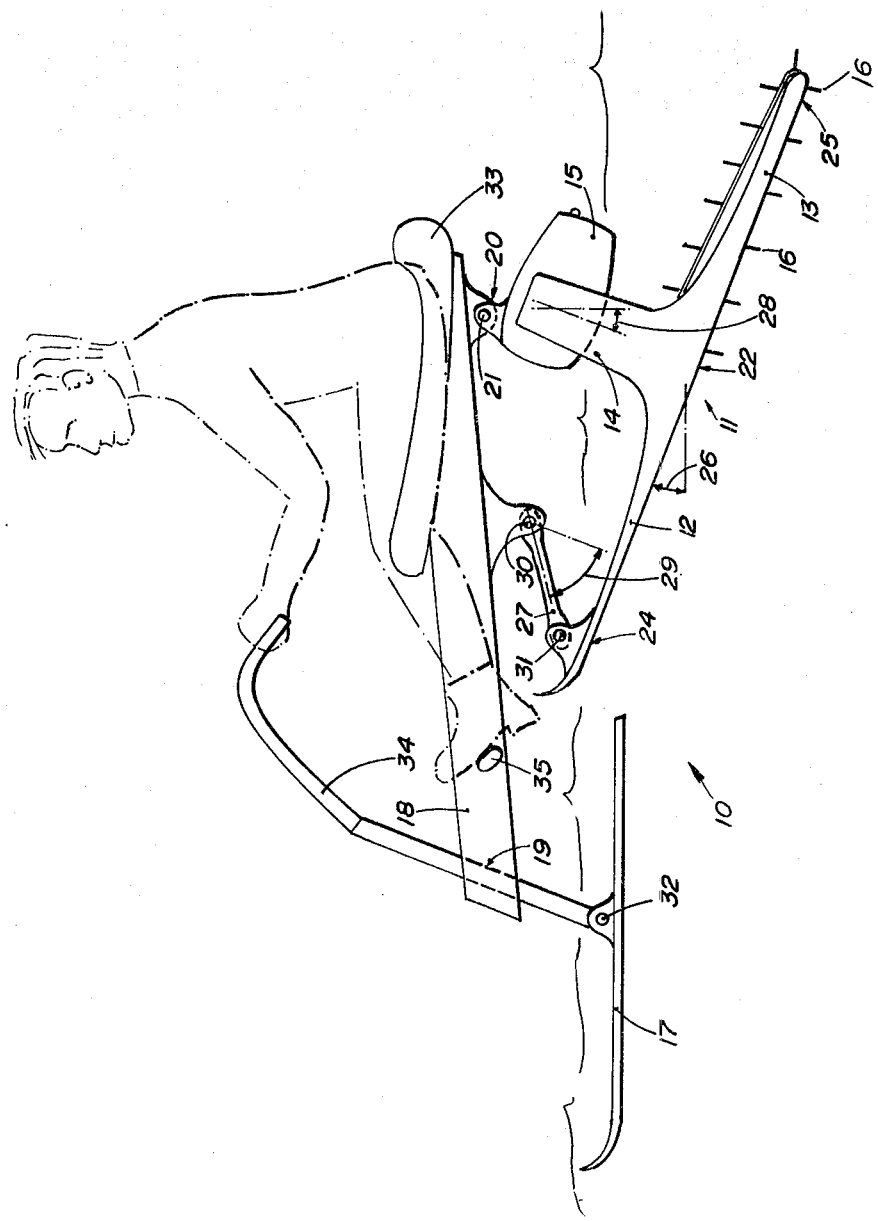
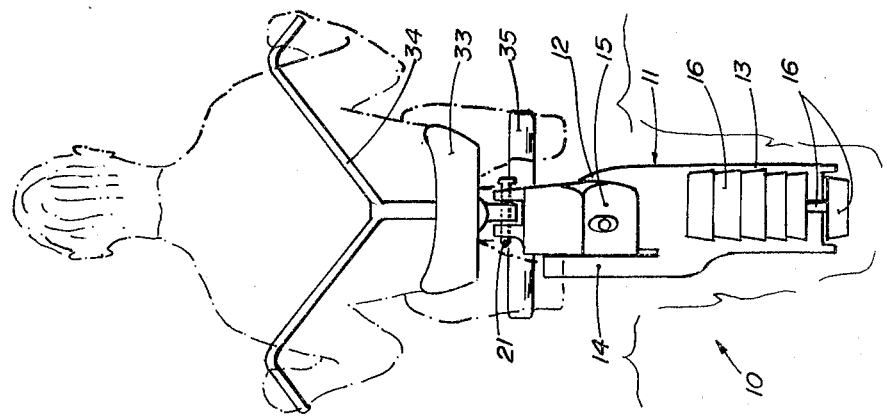

POWER DRIVEN SKI-BOB WITH SELF ENERGIZING FRAME

BACKGROUND OF THE INVENTION

The present invention relates to a power driven ski-bob which is a newcomer to the field of winter recreation.

Presently, the winter sport enthusiasts are polarized. Some adhere to skis propelled by muscles (cross-country) or gravity (Alpine) and some prefer to mount a heavy powerful vehicle, the snowmoble.

A power driven ski-bob, such as shown in my U.S. Pat. Nos. 4,109,739, 4,129,193 and in my U.S. patent application Ser. No. 872,688, all of which are hereby being incorporated by reference, bridge the gap by providing a light weight, agile device which relies on the rider's sense of balance and which uses a small fraction of the power required by a snowmobile.

To achieve this unique effectiveness of design (the power driven ski-bob may weigh one tenth of the the average snowmobile), the power driven ski-bob relies on a plurality of subtle design features, some of which are described in my previously referred to patents and patent application as well as on the improvement shown herein.

A power driven ski-bob develops traction through its propulsion unit which preferably comprises an anterior sliding surface and a posterior endless tread portion. For example, a power driven ski shown in my U.S. Pat. No. Re. 29,657, which is herein being incorporated by reference, would make an efficient propulsion unit. The efficiency of the propulsion unit can be further improved, dramatically, by biasing weight between the anterior and posterior portions and by adjusting the angle of attack between the propulsion unit and the snow, according to the snow conditions (deep, powdery, etc.) and to the ride mode (acceleration, coasting, going up or down hill, etc.). Generally, it can be said that under normal conditions, it is preferred to distribute a substantial amount of the power driven ski-bob's gross weight (gross weight includes the rider's weight), on the sliding surfaces since they develop the least amount of drag as a result thereof, and since it does not contribute to internal friction in the endless tread portion and associated tread wear as does weight which is born directly by the endless tread portion. However, when increased traction is required for accelerating and/or climbing a hill, it is important to shift weight to the endless tread portion to assure traction and secure the engagement of the tread with the snow. Further, in deep heavy snow, when the going is rough, the propulsion unit is sunken and countinously tries to get out of a hole (which becomes an elongated channel as the propulsion unit moves forward). Under this condition the propulsion unit should be inclined to increase the angle of attack between its undersurface and the snow in its path (as in an airplane's wing before landing). Providing such a suitable geometry for this condition substantially improves the ability of the power driven ski-bob to move in deep heavy snow.

SUMMARY OF THE PRESENT INVENTION

The present invention comprises a power driven ski-bob having an elongated propulsion unit preferably with an anterior sliding surface portion, a posterior endless tread portion and an upwardly extending post means. The propulsion unit connects to the rest of the power driven ski-bob through a pivot connection which is located substantially higher than an undersurface of said propulsion unit so that in response to thrust generated by the propulsion unit's tread against the snow, the pressure between the snow and the anterior and posterior portions become decreased and increased respectively, and the geometrical postition of the propulsion unit is altered so that the angle of attack of its undersurface relative to the snow in its path is increased. Thus, according to the amount and in response to the thrust generated by this tread, the angle of attack of the undersurface and the pressure of the tread against the snow automatically increases or decreases, improving the power driven ski-bob's ability to negotiate heavy snow.

BRIEF DESCRIPTION OF THE DRAWINGS

FIG. 1 is a side view of a power driven ski-bob according to the present invention and FIG. 2 is a rear view of the same.

DETAILED DESCRIPTION OF THE DRAWINGS

FIGS. 1 and 2 show a power driven ski-bob 10 comprising: an elongated propulsion unit 11 having an anterior sliding surface portion 12, a posterior endless tread portion 13 and an upwardly extending post means 14. An engine 15 mounted to the post means 14 is coupled via a roller chain (not shown) or another conventional manner to a tread 16.

The power driven ski-bob 10 also comprises a front steerable ski 17, a bridge means 18, which connects to the ski 17 by a swivel connection 19 (as in bicycle and the like) and to said propulsion unit 11 through said post means 14 by a pivot connection 20. The pivot connection as illustrated, utilizes a pin 21 which can readily be pulled out for knocking down the unit, however other forms of pivot connection such as a flexible plastic strip which allows the pivot action by its elastic spring action can be used.

The pivot connection 20 is located substantially higher than an undersurface 22 of the propulsion unit 11, so that when thrust is generated by the tread 16 against snow, the propulsion unit 11 rotates in a clockwise direction around the pivot connection 20 relative to the power driven ski-bob 10, decreasing and increasing the pressure between the anterior and posterior portions respectively, against the snow thereby automatically securing the engagement between the tread and snow. In addition, this rotation of the propulsion unit 11 forces a front end 24 and a rear end 25 of the undersurface 22 upwards and downwards, respectively, thereby increasing an angle of attack 26 between the undersurface and the snow in its path. The increased angle of attack 26 improves the ability of the undersurface 22 to wedge, pack and climb over snow in its path.

It can be readily understood that the phenomenas of pressing on the tread 16 and the increase of the angle of attack 26 are intermixed. That is, the harder the snow the more energization would occur and a lesser increase of the angle of attack 26, and visa versa. This is a desirable relationship since the increased angle of attack 26 is primarily required when the propulsion unit is sunken and continuously has to try and climb out of a channel it is in, where the bias of pressure is the more effective way to improve traction on a harder snow. Thus, it can be seen how the frame, according to the present invention, automatically, optimally and simultaneously adjusts the pressure bias and the angle of attack according to both the traction level which is required and the snow condition. Further, when traction requirement and/or softness of terrain are reduced, the above bias and/or angle of attack are also reduced to avoid excessive drag which otherwise may be generated by the rear end of the propulsion unit 11, being hooked downwards in the snow.

The anterior sliding portion 12 is made of a resilient material, for example, fiberglass reinforced plastic and its frontal section is linked to the bridge means 18, so that the attack angle 26 has a positive value when the power driven ski-bob 10 is in its free position, that is, when it is not subjected to external forces such as a rider's weight or a reaction to the thrust generated by the tread.

To allow the relative movement of the propulsion unit 11 sub-assembly relative to the rest of the power driven ski-bob, and to facilitate the automatic adjustment of the angle of attack 26, the front section of the anterior portion 12 is linked to the bridge via a link 27 which is flexibly or pivotly connected at its ends to the bridge means 18 and to the anterior portion 12. The link 27 is substantially shorter than the post means 14 so that when the propulsion unit 11 moves forward, the post means 14 swings around its pivot connection 20, a certain angular displacement 28, the link 27 swings through a larger angle 29. Due to the geometrical prearrangement of the parts involved where link 27 is upwardly and rearwardly inclined when the power driven ski-bob is in its free position, the angular displacements of the post means and of the link 27, 28 and 29 respectively, are translated to a larger upwards movement at the point that the link 27 connects to the propulsion unit 11 than at the point which the post means 14 connect to the propulsion unit. This phenomena compliments the action by which the angle of attack 26 is increased, as previously explained, when the tread 16 develops thrust against snow.

The engine 15 which is mounted to the post means 14, essentially forms a part of the post means since it provides the pivot connection 20, by which the post means 14 connects to the bridge means 18.

The bridge means 18 are preferably made of a hollow construction and can be used as a gasoline tank.

Overall, it can be noted that while the present invention has some important functional advantages, a power driven ski-bob 10, made according to the present invention is structurally simple and economical to fabricate.

For clarity, several additional components are identified by numerals as follows: Numerals 30, 31 and 32 indicate pivot connections. Numeral 33 indicates a seat which is mounted to the bridge means 18. Numeral 34 indicates a handlebar and numeral 35 indicates foot pegs.

While the present invention has been illustrated with a single embodiment, it should be appreciated that substitutions and modifications can be made without departing from the spirit of the invention or the scope of its claims.

I claim:

1. In a power driven ski bob comprising in combination:
    an elongated propulsion unit having an anterior sliding surface portion, a posterior endless tread portion and an upwardly extending post means,
    an engine coupled to said endless tread,
    a front steerable ski,
    a bridge means which connects to said front steerable ski through a swivel-connection and said post means through a pivot connection,
    the improvement wherein said pivot connection is substantially higher than an undersurface of said propulsion unit so that the pressure between said anterior sliding surface and the snow is decreased and the pressure between said posterior endless tread portion and the snow is increased in response to thrust generated by said tread against the snow, so that engagement of said tread with the snow would be secured as said propulsion unit rotates around said pivot connection.

2. A power driven ski-bob as in claim 1 wherein said anterior sliding surface portion is made of resilient construction and its frontal section is linked to said bridge means so that it is biased upwards and said posterior endless tread portion is biased downwards for assisting in pressurizing of the posterior endless tread portion against the snow, and for cushioning the ride of said power driven ski-bob over an uneven terrain.

3. A power driven ski-bob as in claim 2 wherein said bridge means is connected to said frontal section of said anterior sliding surface by a link which is substantially shorter than said post means.

4. A power driven ski-bob as in claim 3 wherein said link is upwardly and rearwardly inclined.

5. A power driven ski-bob as in claim 1 wherein said engine is mounted on said post means.

6. A power driven ski-bob as in claim 1 wherein said engine forms a part of said post means.

7. In a power driven ski-bob comprising in combination
    an elongated propulsion unit having an elongated undersurface, an endless tread rotateably supported thereon and an upwardly extending post means,
    an engine coupled to said tread,
    a front steerable ski,
    a bridge means which connects to said front steerable ski through a swivel connection and to said post means through a pivoting connection,
    the improvement wherein said pivot connection is substantially higher than said undersurface so that a front end and rear end of said undersurfaces are moved upwards and downwards, respectively, in response to thrust generated by said tread against snow, increasing the angle of attack of said undersurface relative to the snow and improving its ability to pack and climb over snow in its path.

8. A power driven ski-bob as in claim 7 wherein said engine is mounted on said post means.

9. A power driven ski-bob as in claim 7 wherein said engine forms a part of said post means.

* * * * *